(12) United States Patent
Johansen et al.

(10) Patent No.: US 7,746,069 B2
(45) Date of Patent: Jun. 29, 2010

(54) METHOD OF DETERMINING A RADIAL PROFILE OF A FORMATION PARAMETER INDICATIVE OF FORMATION TREATMENT EFFICIENCY

(75) Inventors: Yngve Bolstad Johansen, Houston, TX (US); Robert M. Leveridge, Houston, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 59 days.

(21) Appl. No.: 12/124,328

(22) Filed: May 21, 2008

(65) Prior Publication Data

US 2009/0289627 A1     Nov. 26, 2009

(51) Int. Cl.
  *G01V 3/00* (2006.01)
(52) U.S. Cl. ...................................... 324/303
(58) Field of Classification Search .......... 324/300–322
  See application file for complete search history.

(56) References Cited

U.S. PATENT DOCUMENTS

| 5,335,542 | A | | 8/1994 | Ramakrishnan et al. | |
|---|---|---|---|---|---|
| 5,712,566 | A | * | 1/1998 | Taicher et al. | 324/303 |
| 5,828,214 | A | * | 10/1998 | Taicher et al. | 324/303 |
| 6,642,715 | B2 | | 11/2003 | Speier et al. | |
| 6,703,832 | B2 | * | 3/2004 | Heaton et al. | 324/303 |
| 6,856,132 | B2 | | 2/2005 | Appel et al. | |
| 6,885,942 | B2 | * | 4/2005 | Shray et al. | 702/6 |
| 7,180,288 | B2 | | 2/2007 | Scheven | |
| 7,363,160 | B2 | * | 4/2008 | Seleznev et al. | 702/7 |
| 7,565,246 | B2 | * | 7/2009 | Fang et al. | 707/12 |

OTHER PUBLICATIONS

Freedman, R., et al., A New NMR Method of Fluid Characterization in Reservoir Rocks: Experimental Confirmation and Simulation Results, Society of Petroleum Engineers Annual Technical Conference and Exhibition, Dallas, Texas, Oct. 2000, SPE 63214, pp. 1-15.

(Continued)

*Primary Examiner*—Brij B Shrivastav
*Assistant Examiner*—Dixomara Vargas
(74) *Attorney, Agent, or Firm*—Helene Raybaud; Vincent Loccisano; James McAleenan

(57) ABSTRACT

A method of measuring a parameter characteristic of a rock formation is provided, the method including the steps of deploying in a section of a well penetrating the rock formation a toolstring combining a tool for generating and measuring responses to a sensing field at different radial depth shells in the rock formation relative to the well and a tool to cause a flow of fluid through the different radial depth shells such that responses to the sensing field are obtained for at least two different radial depth shells and for at least two different flow conditions in said at least two different radial depth shells to determine a radial depth dependent profile of said parameter.

21 Claims, 8 Drawing Sheets

OTHER PUBLICATIONS

Lo, S-W., et al., Correlations of NMR Relaxation Time with Viscosity, Diffusivity, and Gas/Oil Ratio of Methane/Hydrocarbon Mixtures, Society of Petroleum Engineers Annual Technical Conference and Exhibition, Dallas, Texas, Oct. 2000, SPE 63217, pp. 1-15.

Freedman, R. et al. Field Applications of a New Nuclear Magnetic Resonance Fluid Characterization Method, Society of Petroleum Engineers Annual Technical Conference and Exhibition, New Orleans, Louisiana, Oct. 2001, SPE 71713, pp. 1-12.

Freedman, R. et al. Fluid Characterization using Nuclear Magnetic Resonance Logging, Petrophysics, vol. 45, No. 3, May-Jun. 2004, pp. 241-250.

Cassou, G., et al. Movable oil saturation evaluation in an ultra-mature carbonate environment, Society of Petrophysicists and Well Log Analysts 1st Annual Middle East Regional Symposium, Abu Dhabi, UAE, Apr. 2007, pp. 1-16.

* cited by examiner

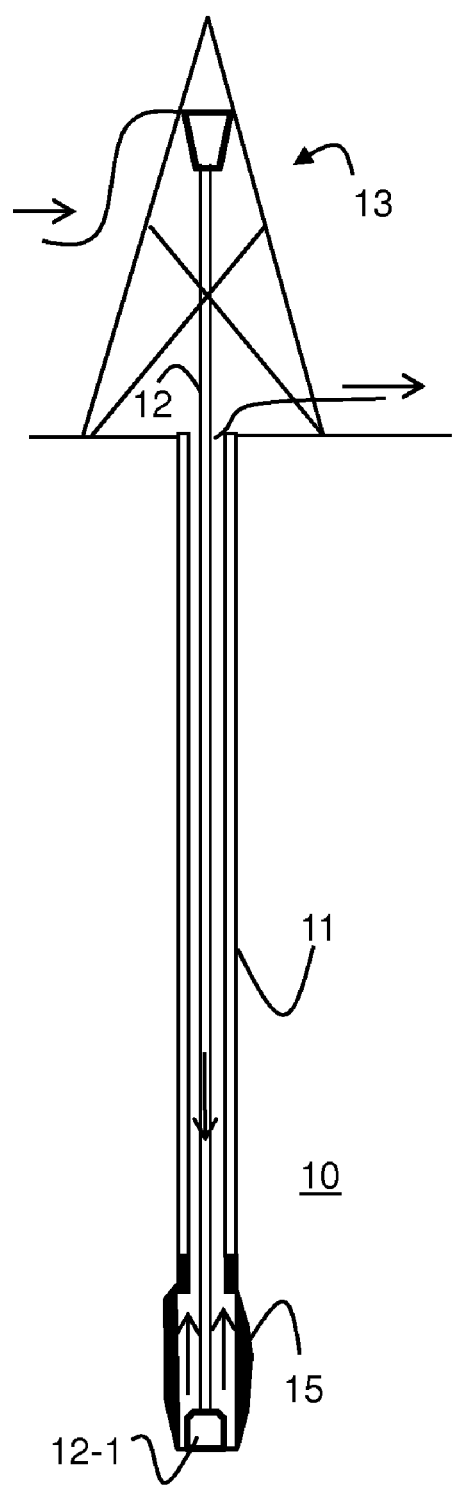
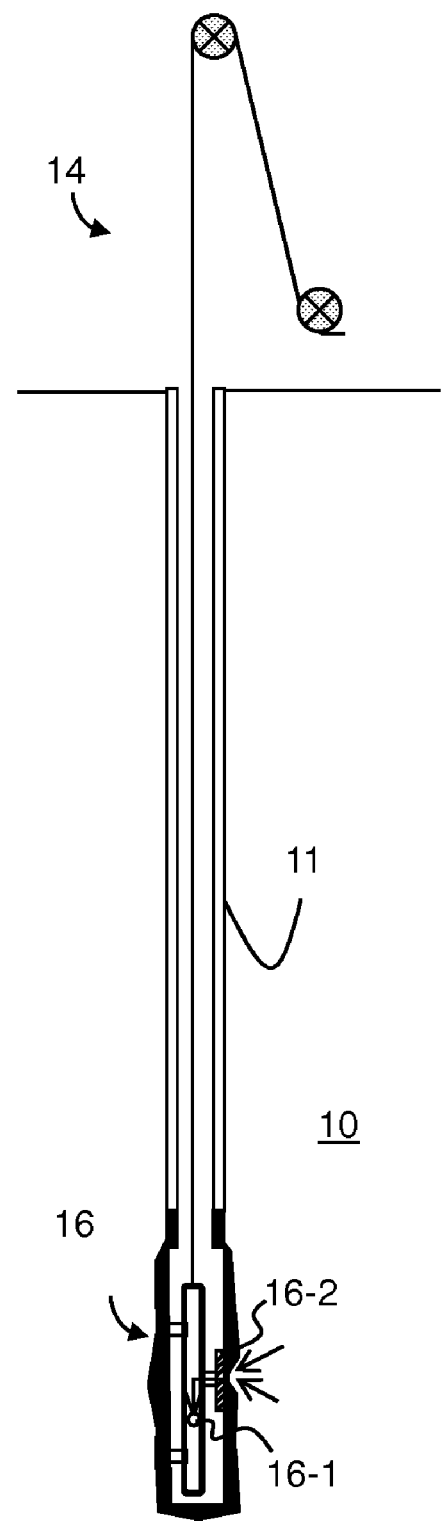
Fig. 1A
(Prior Art)
Fig. 1B
(Prior Art)

METHOD OF DETERMINING A RADIAL PROFILE OF A FORMATION PARAMETER INDICATIVE OF FORMATION TREATMENT EFFICIENCY

FIELD OF THE INVENTION

The invention relates to methods of determining parameters relevant to the formation properties and formation fluid properties of subterranean reservoirs, particularly hydrocarbon reservoirs. More specifically, the invention relates to methods of measuring formation parameters in the presence of a localized induced flow within the formation.

BACKGROUND

In the course of assessing and producing hydrocarbon bearing formations or reservoirs, it is important to acquire knowledge of formation and formation fluid properties which influence the productivity and yield from the drilled formation. In many cases such knowledge is acquired by methods generally referred to as "logging".

Logging operations involve the measurement of a formation parameter or a formation fluid parameter as a function of location, or more specifically depth (as measured along the length of the well). Formation logging has evolved to encompass many different types of measurements including measurements based on sonic, electro-magnetic or resistivity, and nuclear measurements such as nuclear magnetic resonance or neutron capture effects.

Nuclear magnetic resonance (NMR) methods are well established in the laboratory to measure fluid flow in pipes, rocks, and biological systems. Typically, flow is measured by encoding molecular displacements in the phase of nuclear spins in the (flowing) fluid, during an evolution interval $\Delta$. An encoding and decoding of the spin's position before and after interval $\Delta$ is affected by means of static or pulsed field gradients. The NMR signal is measured for either a range of phase encoding times or a range of gradient strengths, or both, and then analyzed. For small static or pulsed field gradient strengths or encoding times, the shift of the phase of the NMR signal is proportional to the velocity and the time which has elapsed between the encoding and the decoding steps. The complete probability distribution of molecular displacements during the evolution period $\Delta$ can be obtained for example from pulsed field gradient-NMR (PFG-NMR) by extending the measurements to larger pulsed field gradient strengths, then Fourier transforming the data. The PFG-NMR type of experiment has been called NMR-scattering in the published literature, and the extraction of probability distributions from such experiments is commonly referred to as a measurement of the propagator in the published literature.

NMR measurements are also commonly used in the borehole to probe the NMR decay behavior of the stationary fluid in the reservoir rock. In these techniques, magnetic fields are established in the formation using suitably arranged permanent magnets. These magnetic fields induce nuclear magnetization, which is flipped and otherwise manipulated using on-resonance radio frequency (RF) pulses. NMR echoes are observed, and their dependence (of their magnitude) on pulse parameters and on time is used to extract information about the formation and the fluids in it.

In particular, NMR has been established in the oilfield industry to obtain information on bound water, free water, permeability, oil viscosity, gas-to-oil ratio, oil saturation and water saturations. All of this information can be derived from measurements of spin-spin relaxation time often referred to as $T2$, spin-lattice relaxation time ($T1$), and self-diffusion coefficient ($D$) of the hydrogen containing formation fluids.

Some of the known NMR tools can be controlled so as to acquire data from different radial depth layers in the formation. These measurements at multiple depths of investigation (DOIs) are usually taken to provide a good signal-to-noise ratio. In some instances, as for example, described in the co-owned U.S. Pat. No. 6,703,832 issued to Heaton and Freedman, differences of the NMR measurements taken at different DOIs are analyzed to determine conditions within the formation.

On the other hand, fluids are routinely sampled in the borehole using various known fluid sampling tools, such as Schlumberger's MDT™. The MDT tool when set up for sampling includes at least one fluid sample bottle, a pump to extract the fluid from the formation, and a contact pad with a conduit to engage the wall of the borehole. When the device is positioned proximate a region of interest, the pad is pressed against the borehole wall, making a tight seal. Fluid in the formation is induced to flow, by pumping fluid out of the formation through the hole in the pad.

Fluid in the formation can also be moved with the help of known dual packer systems. The dual packer system seals off a section of the borehole (on the order of feet) with inflatable packer elements. When a dual packer is used to pump fluid from the formation, fluid will be extracted from the borehole section which is sealed off.

Samples of the fluid are either analyzed in-situ within the body of the tool or placed into a sample bottle for later analysis. The module or dual-packer section is then moved to the next region of interest (station). Information regarding the movement of fluid in the formation during the pumping process can provide valuable information related to formation and fluid sample properties.

Fluid flow towards the borehole is also routinely produced during pressure testing, essentially in the same manner as described for the MDT tool described above. Accordingly, useful information may be similarly obtained during this process.

It is further well established to mount the measurement tools for a logging operation on either dedicated conveyance means such as wireline cables or coiled tubing (CT) or on the drilling string. The latter case is known in the industry as measurement-while-drilling (MWD) or logging-while-drilling (LWD). In MWD and LWD operations the parameter of interest is measured by instruments typically mounted close behind the bit or the bottom-hole assembly (BHA). Both, logging in general and LWD are techniques known for decades and hence require no further introduction.

Combinations of a flow generating tool such as the MDT with tools for performing NMR measurement are described in a number of published documents including for example in co-owned U.S. Pat. No. 7,180,288 to Scheven. Another detailed description of possible NMR-based methods for the purpose of monitoring flow and formation parameters can be found in co-owned U.S. Pat. No. 6,642,715 to Speier et al. and U.S. Pat. No. 6,856,132 to Appel et al. A tool which combines a fluid injection/withdrawal tool with a resistivity imaging tool is described for example in U.S. Pat. No. 5,335,542 to Ramakrishnan et al.

In an paper prepared for presentation at the SPWLA 1st Annual Middle East Regional Symposium, Apr. 15-19, 2007 Gilles Cassou, Xavier Poirier-Coutansais, and Raghu Ramamoorthy, demonstrate that the combination of advanced-NMR fluid typing techniques with a dual-packer fluid pumping module can greatly improve saturation estimation in carbonates. The ability to perform 3D-NMR stations immediately before and after pump-outs yields both the water and oil saturation Sw and Sxo, independently of lithology, resistivity, and salinity, in a complex carbonate environment.

In view of the known art, it is seen as one object of the invention to improve and enhance the effectiveness of NMR based tools or other wellbore tools for the purpose of characterizing the formation and its fluid content using measuring apparatus with a volume of investigation overlapping or co-located with the volume in which the induced flow occurs.

SUMMARY OF INVENTION

According to a first aspect of the invention, a method of measuring a parameter characteristic of a rock formation or its fluid content is provided, the method including the steps of deploying in a section of a well penetrating the rock formation a toolstring combining a tool for generating and measuring responses to a sensing field at different radial depth shells in the rock formation relative to the well and a tool to cause a flow of fluid through the different radial depth shells such that responses to the sensing field are obtained for at least two different radial depth shells and for at least two different flow conditions in said at least two different radial depth shells to determine a radial depth dependent profile of said parameter.

In a preferred embodiment, the invention includes the step of letting formation fluid flow into the depth shells, thereby at least partly replacing wellbore fluid from the measuring volume. In a variant of this embodiment, the flow is caused by engaging a probe with the wall of the well and using a pumping mechanism to withdraw fluid from the formation. Alternatively the flow may be caused by increasing or reducing the pressure in at least a section of the well, preferably between two removable well sealing devices, such as the dual packers.

In a further preferred embodiment, the method includes the step of determining a sweep efficiency with a given amount of fluid pumped through the depth shells at various radial depths thus creating a radial depth profile of the sweep efficiency.

In a further preferred embodiment, the method includes the step of determining a parameter indicative of wettability of formation rock.

It is further contemplated to use the profiles of the measured parameter, such as sweep efficiency, versus radial depth in a further step of classifying or identifying rock types in the formation. This can be done by for example comparing a measured profile with libraries or databases of similar profiles of defined rock types. Such databases can be built from prior in-situ measurements of rock formations or from equivalent measurements on rock cores in a laboratory.

In another preferred embodiment of the invention, the formation parameter to be measured is selected from a group consisting of absolute or relative amounts of bound water, free water, permeability, oil viscosity, gas-to-oil ratio, oil saturation and water saturations and parameters derived therefrom.

In a further preferred embodiment of the invention, the method includes the further step of measuring or estimating parameters characteristic of the flow through the depth shells. Such parameters can be selected from flow volumes, relative flow volumes, flow velocities or other parameters which characterize the flow, its kinetic energy or impact on the rock formation.

In a further preferred embodiment of the invention, the method includes the further step of measuring or estimating parameters indicative of the pore volume of the respective depth shells.

Combining the above embodiments, it is possible to express sweep efficiency and other parameters in dependence of the fluid flow through the depth shells or in dependence of units of pore volumes flown.

In a preferred embodiment, the field is a magnetic field. In a variant of this embodiment, a distribution of the spin-lattice relaxation or T1 distribution or, alternatively, a spin-spin relaxation or T2 distribution is derived from the sensor response. In an even more preferred variant, magnetic resonance fluid (MRF) characterization, which includes a measure of diffusion, is derived from the sensor response and used as a basic measurement for the purpose of this invention.

Further details, examples and aspects of the invention will be described below referring to the following drawings.

BRIEF DESCRIPTION OF THE FIGURES

FIG. 1A illustrate a conventional drilling operation;

FIGS. 1B and 1C illustrate logging operations in accordance with examples of the invention;

DETAILED DESCRIPTION

Figure 1C:
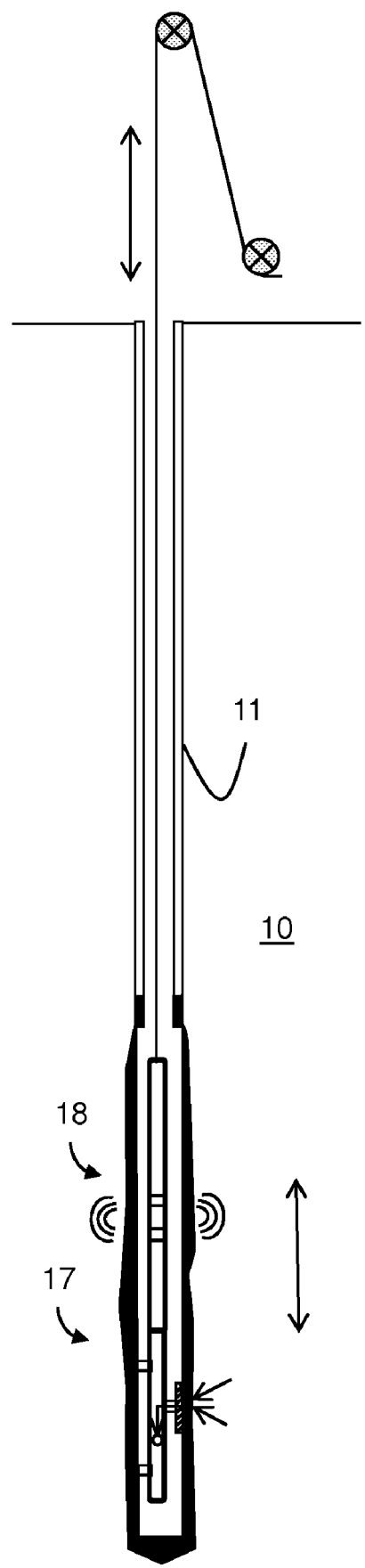

In FIG. 1A, a well 11 is shown in the process of being drilled through a formation 10. A drill string 12 is suspended from the surface by means of a drilling rig 13. A drill bit 12-1 is attached to the bottom of the drill string 12.

While drilling, a drilling fluid is circulated through the drill string 12 and the drill bit 12-1 to return cuttings to the surface via the annulus between the wall of the well 11 and the drill string 12. During this process, part of the drilling fluid invades a shallow zone 15 around the borehole 11 thus contaminating the formation fluid. After a section of well has been drilled, the drill string 12 is lifted from the well.

After the drilling process, a wireline tool 16 as shown in FIG. 1B is lowered into the well 11 using a wireline cable 14. In the example as illustrated the wireline tool includes a formation testing device 16-1 to be used for causing a flow in the formation and an NMR-based tool 16-2 with antennas (not shown) such that a magnetic field can be generated within the volume of the formation affected by the flow. Such tools have been described in the prior art, including co-owned U.S. Pat. No. 7,180,288 to Scheven, co-owned U.S. Pat. No. 6,642,715 to Speier et al. and U.S. Pat. No. 6,856,132 to Appel et al.

In an alternative arrangement as shown in the FIG. 1C, the formation testing device 17 and NMR-based tool 18 are separated and mounted as part of the same tool string. In operation, the NMR tool 18 is lowered to the desired depth to make a first base-line survey. Then the testing device is pulled to the same depth to withdraw fluid at a known rate and composition. The changes caused by this flow are then registered by a second NMR measurement, after it is lowered again to the depth in question.

In all of the above examples, the testing device is shown as a single probe device. However for most applications of the present invention the probe device can be replaced by a dual-packer device without changing the fundamental benefits of the new methods.

The known NMR tools are in principle capable of measuring signals at different depths of investigation (DOIs) and, in the following, it is described how this capability can be used to increase the accuracy of measurements of formation parameters under different flow conditions including such parameters as absolute or relative amounts of bound water, free water, permeability, oil viscosity, gas-to-oil ratio, oil saturation and water saturations and parameters derived therefrom.

Figure 2:
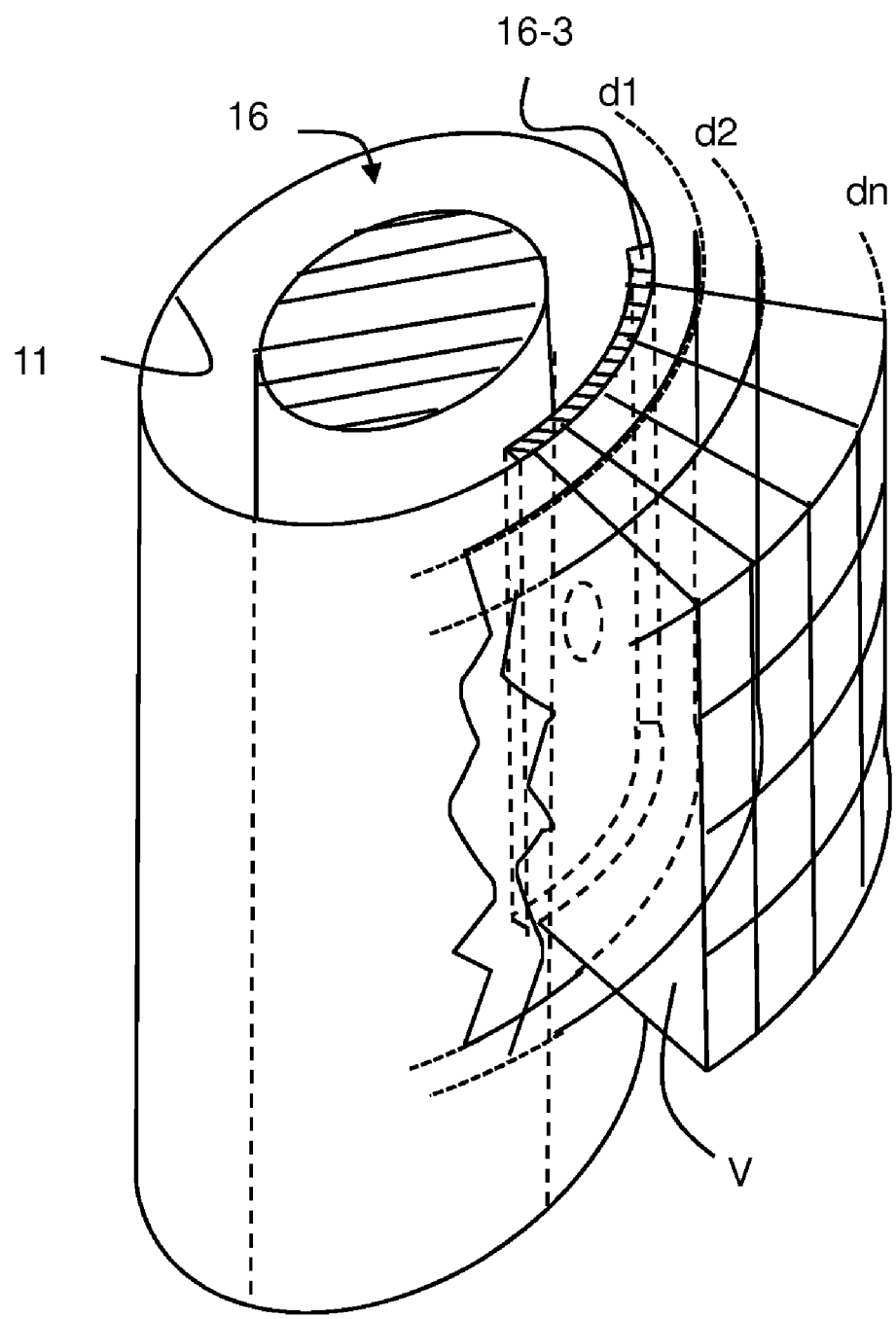
FIG. 2 shows different radial depths levels as used in an example of the present invention.

In FIG. 2, there is shown a schematic drawing of the tool 16 of FIG. 1C with its sampling pad 16-3 in the well 11. The volume of the formation into which the sensing field is projected is shown as measuring volume V. The measuring volume includes a number of different sub-volumes referred to herein as depth shells. Two depth shells at different radial depths of investigations or DOIs are indicated as cylindrical planes d1, d2. The measuring volume V is assumed to extend to a depth shell at a distance dn from the well 11.

Figure 3A:
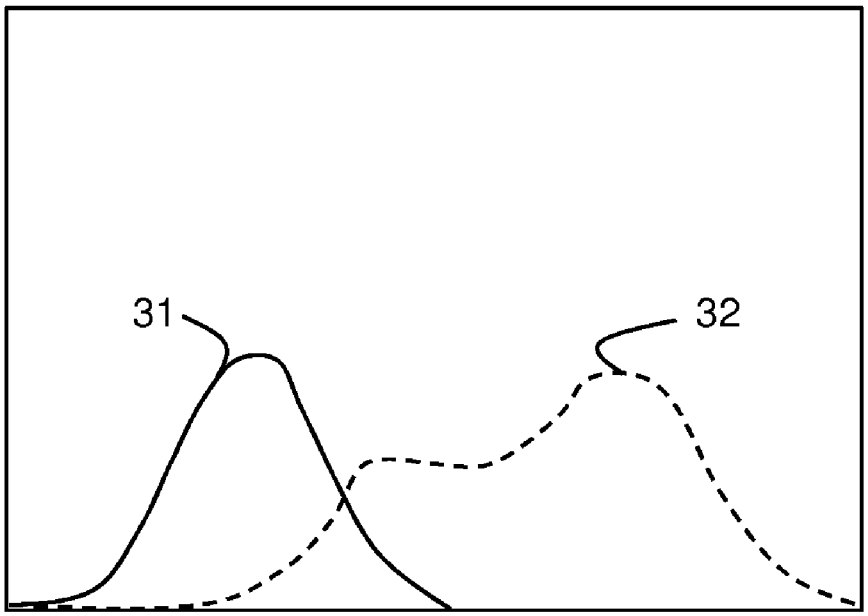
FIGS. 3A and 3B are schematic diagrams to illustrate the effect of radial depth on NMR measurements in the formation at a first flow condition.
Figure 3B:
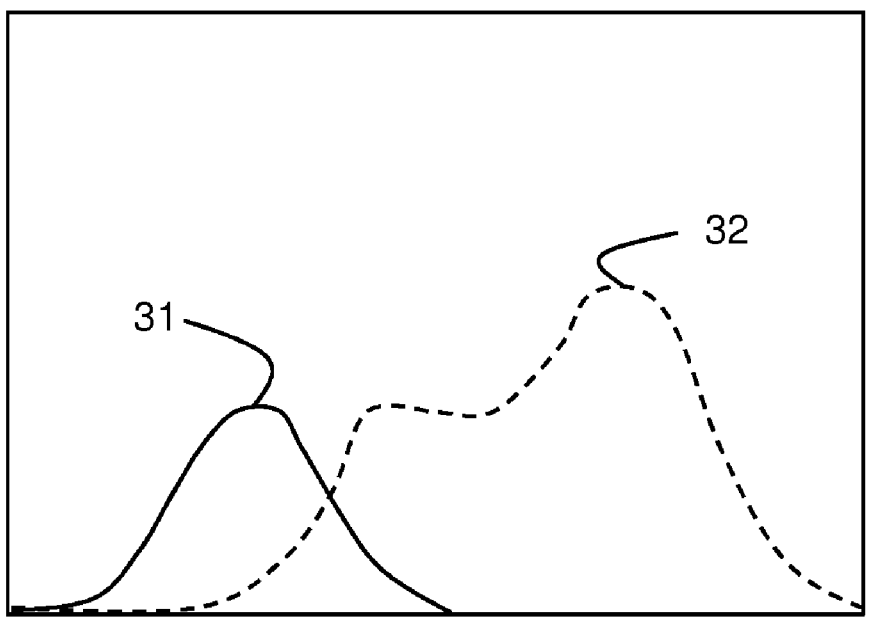

The following FIGS. 3A and 3B show simplified examples of T1 distributions as would be measured by an NMR tool at two different depths of investigation (DOIs), e.g., FIG. 3A illustrating the T1 distribution at radial depth shell d1, and FIG. 3B the T1 distribution at radial depth shell d2 as shown in FIG. 2 above. The water signal is shown as a solid line 31 and oil as a dashed line 32.

Figure 4A:
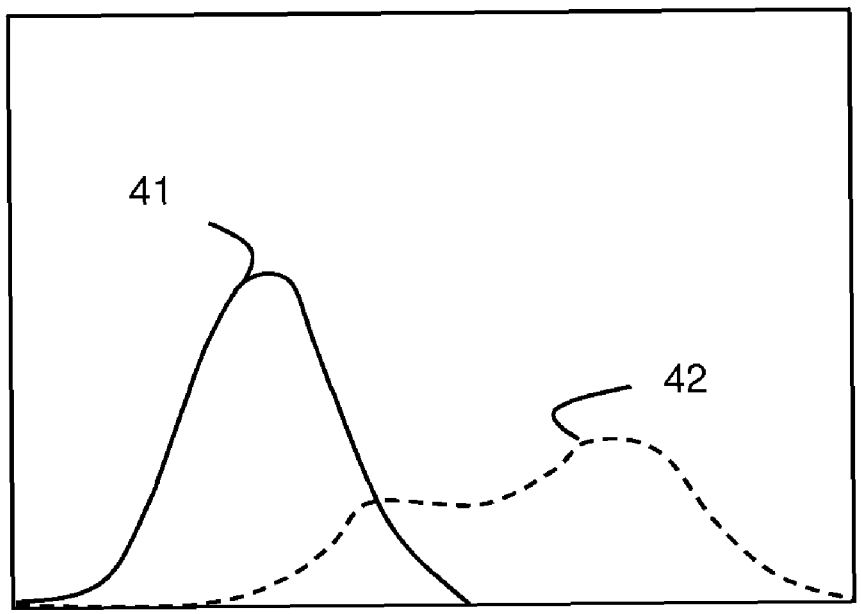
FIGS. 4A and 4B are schematic diagrams to illustrate the effect of radial depth on NMR measurements in the formation at a first flow condition.
Figure 4B:
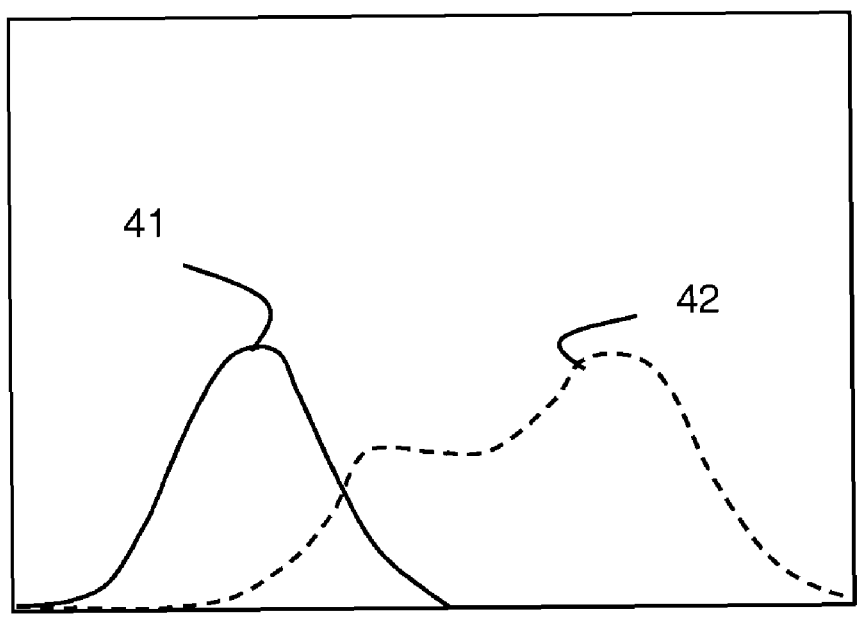

When pumping a volume of fluid, for example water, from the tool into the formation, the Ti distributions in d1 and d2 alter as the fluid is pumped through the shells of the formation at d1 and d2. This process is illustrated by comparing FIGS. 3A and 3B with FIGS. 4A and 4B, respectively. The FIGS. 4A and 4B show schematically how the T1 distributions of fluids in the shells d1 and d2, respectively, changes after a volume of water is pumped through the measuring volume. In both figures, the water signal is again shown as a solid line 41 and oil as a dashed line 42.

For the purpose of the present invention, it is seen as advantageous to minimize the time between the multi-DOI NMR measurement and hence the time between changing the flow conditions and performing the measurements. As time lapses between measurements, the intended measurement can perturbed by uncontrolled processes inside the formation, for example re-invasion by wellbore or formation fluids. The advantage of combining a multi-DOI NMR measurement and a formation sampler or a dual-packer type instrument is that the multiple-DOIs can be repeated either immediately after each pumping stage or even during the pumping (in-situ).

As stated above, it is in principle possible to derive the saturations and hence the relative volumes of different fluid phases from the T1 distributions by calculating the areas under the curves and the total area. However, in the more advanced measurement methods used presently in NMR logging, the T1 or T2 distributions are measured together with the diffusion coefficient of hydrogen. Due to this diffusion editing or other sequences that use multiple TE's (inter-echo spacings) to determine the various diffusion coefficients (D) of the fluids in place, it is possible to discriminate more efficiently between gas, oil and water and hence determine the saturations in the formation easier and more accurately.

Figure 5:
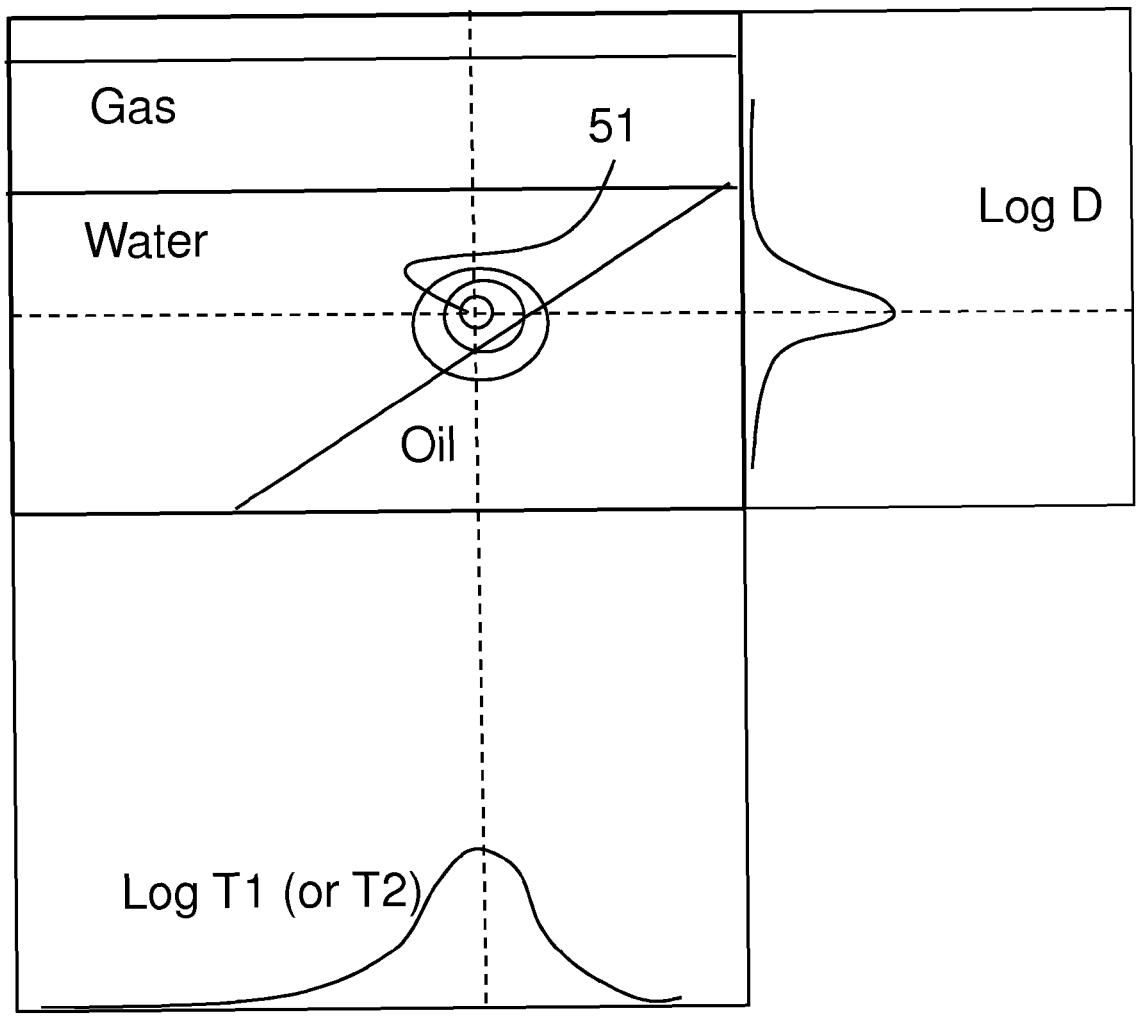
FIG. 5 illustrates a known method of determining saturations within the formation.

FIG. 5 shows an example of a DC-T1 map. In this form of the crossplot of the logarithmically scaled Log T1 and Log D measurements as indicated as lower panel and right panel, respectively, gas in the formation causes a distribution signal located near the upper horizontal (gas) line, water in the formation causes a signal near the second horizontal line and an oil signal (as indicated by distribution 51) lies on or near the oil line, which slopes from right to left across the plot.

While any of the above measurements can be used to obtain a radial depth profile of saturations or volumes of the fluids in the formation, it is proposed in the following extension of the example to transform this profile into a radial depth profile of sweep efficiency. The sweep efficiency, whilst being an important parameter in its own right, can serve as the basis for determining further parameters characterizing the formation, its fluids and the potential for oil recovery.

The sweep efficiency can be defined in various ways. As to the knowledge of the inventors there is presently no generally accepted standard definition of sweep efficiency. In the oilfield industry, sweep efficiency is typically related to how efficiently water can sweep out oil of a reservoir on a macroscopic level, hence the displaced fluid A is typically oil and the displacing fluid B is water, brine or a water based enhanced oil recovery (EOR) composition.

As the sweep efficiency is based on and closely related to the measurements of the volume of the fluids in the pore space, i.e. saturations, the present invention defines sweep efficiency as a measure which includes the volume of fluids in a given volume of the porous medium and the volume of fluid pumped into or through the given volume. To render a measurement of the sweep efficiency for a porous medium comparable between different experiments, the volume of displacing fluids can be defined in units of the total pore volume (TPV) of the test volume. A method of establishing a measure of the TPV applicable to the above example of an NMR measurement at various DOIs is given below.

A useful specific definition meant to fall under the above general definition of sweep efficiency includes the ratio B/A+B of the displacing fluid B and the total volume of displacing fluid and displaced fluid A. This ratio at the point where 1 TPV of B have been pumped into the test volume is often referred to as the displacement efficiency, which could taken as a specific definition of the sweep efficiency.

Sweep efficiency is typically defined so as to range between 0 and either 1 or 100%. It depends on the number n of TPV units of fluid B pumped into the test volume or, alternatively, can approach an asymptotic value E∞ when an irreducible part of fluid A remains in the pore volume of the medium. The latter case is more common in a hydrocarbon reservoir or any other heterogeneous porous media. This asymptotic value of saturations or their respective ratio can also serve as definition of sweep efficiency.

Other useful definitions of the sweep efficiency can be based on the time development of the saturation, and hence can be based on differences in saturation between two or more points in time, including the time before, during and after the pumping process. Given a pump rate or the metering of the volume pumped, the time measurement can be readily converted into the volume of displacing fluid B pumped.

Hence useful definitions for sweep efficiency can include differences of saturations such as $E_x = S_{A\text{-}after\,(x)} - S_{A\text{-}before\,(x)} / (1 - S_{A\text{-}before(x)})$ which links the sweep efficiency $E_x$ for a DOI of x to the differences of the saturation $S_A$ of the displaced fluid A before and after a pumping step divided by a normalizing factor. Or the shape of the time evolution of the saturations is captured by a definition of sweep efficiency which includes for example differentials of saturations or of ratios of saturations in time or volume pumped such as $dS_{A(x)}/dt$ or $dS_{A(x)}/dTPV = \Delta S_{A(x)}/\Delta TPV$.

As mentioned above, in this example the sweep efficiency is determined as a function of the volume pumped by using either flowmeters in the tools described above or, when using a constant pump rate, by measuring the pump time. The measured volume is then converted into multiples of pore volume in the test volume by the following steps, which assume the test volume to be the volume of the shell which contributed signal to the measurement at the respective DOI.

Use is made of six parameters to establish a sweep efficiency depth profile which can be taken to be relatively independent of the specification of tools applied and the operating conditions used. Apart from the saturations at each depth shell before the flow of the volume, and the saturations at each depth shell after (as measured above), these parameters are the volume of fluid which passed through the layers in terms of pore volume, a measure of the relative amounts or proportions of spherical flow and radial flow, potential mismatches in the position of the measuring tool at the times of measurement, and the volume of each shell.

By making simplifying assumptions, the determination of the parameters can be made easier. One assumption would be for example to stipulate a homogeneous flow through the formation within the measuring volume.

The volume pumped is measured while operating the pump. To have a well defined volume, it is measured after the continuous phase in the flowline turns into oil (or water). The volume used for shell x should then be the accumulated pump volume from this point in time plus $\pi(BS/2+DOI_x)^2 h - \pi(OD$ Packer mandrel$)^2 h$. h is height of the sealed off interval and $BS/2+DOI_x$ is the radius of shellx. For a dual packer tool, the typical packer interval used is 1 m, which leads to $\pi(BS/2+DOI_x)^2 - \pi(OD$ Packer mandrel$)^2$. The calculation assumes for the sake of simplicity cylindrical flow, but a similar calculation applies for spherical flow.

Having already assumed that the flow is homogenous in the test interval which typically assumes that the porosity is relatively homogenous within a small volume, it may be possible to perform the measurement of the NMR tool and the formation testing tool at a small offset in the well. It is however preferable to position the tool in the same place to reduce those uncertainties. Using for example an accelerometer is in the toolstring as in the MR Scanner™ family of Schlumberger NMR tools, the orientation of the tool in the well can be calculated and corrected. Under these condition, the volume of each of the shells can then be calculated according to equation [1]:

$$TSPV_{shellx} = 2\pi R_{Shellx} A(\Delta R_{Shellx}) h_x \phi_x \qquad [1]$$

wherein

A=defines the size of a circular sector (1 being the whole circle and ¼ for example being 90 deg)
$R_{Shellx} = BS/2 + DOI_{Shellx}$
$\Delta R_{shellx} = 2\pi f_x/\gamma(\Delta B_x/\Delta r_x) AQF_x$
$f_x$=frequency of Shell x
$h_x$=height of Shell x (since packer interval>shell height we can set h to packer interval)
$\phi_x$=porosity of shell x
$\Delta B_x/\Delta r_x$=magnetic field gradient at shell x
$\gamma$=H1 gyromagnetic ratio and
$AQF_x$=Antenna quality factor of shell ($f_x/\Delta f_x$).

The above calculation yields a pore volume TSPV of the shell x, which is equivalent to the TPV defined above for the purpose of the multi DOI NMR measurements. Using this result, the volume of fluid pumped by the tool can be transformed into multiples of the pore volume. This is applied to the schematic profiles of FIGS. 6A and 6B, which illustrate depth profiles of the sweep efficiency for two different porous media, respectively, at the same radial depths d1, d2, d3 and dn and with the same normalized pumped volume n*TSPV.

Figure 6A:
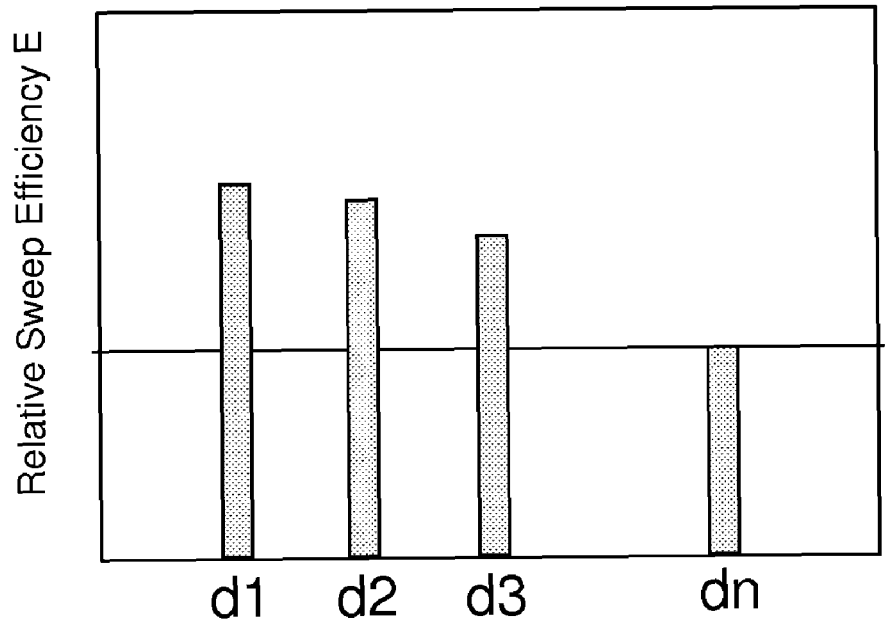
FIGS. 6A and 6B illustrate sweep efficiency profiles in accordance with an example of the invention for rocks with different wettability.
Figure 6B:
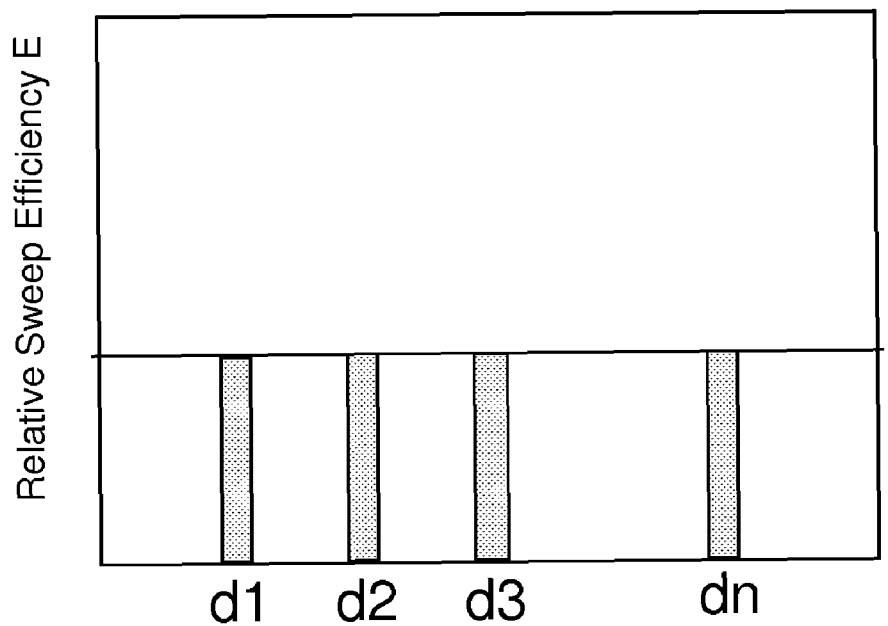

In the preparation of the sweep efficiency profiles of FIGS. 6A and 6B, the sweep efficiency $E_x$ as determined for each shell has been normalized using the sweep efficiency of the outer shell $E_n$. It is believed that this normalization further improves the interpretation of the profile and its use in comparison with similar profiles.

When comparing now for example the profile of FIG. 6A with the profile of FIG. 6B, the latter shows a profile which can be expected to be closer to the case of an oilwet porous media, where the effect of a water flooding is less pronounced compared to the effect on a water wet rock as illustrated by FIG. 6A.

The above examples of FIG. 6A and 6B serve to illustrate that the radial profile of sweep efficiency is expected to be significantly different for a waterwet formation compared to an oilwet formation depending on the continuous phase of the fluid being pumped. By registering this difference, methods in accordance with the present invention can be used to determine the in situ wettability of a formation surrounding a well, even in situ, and to detect, where present, wettability changes in the borehole axis if multiple stations are made.

Figure 7:
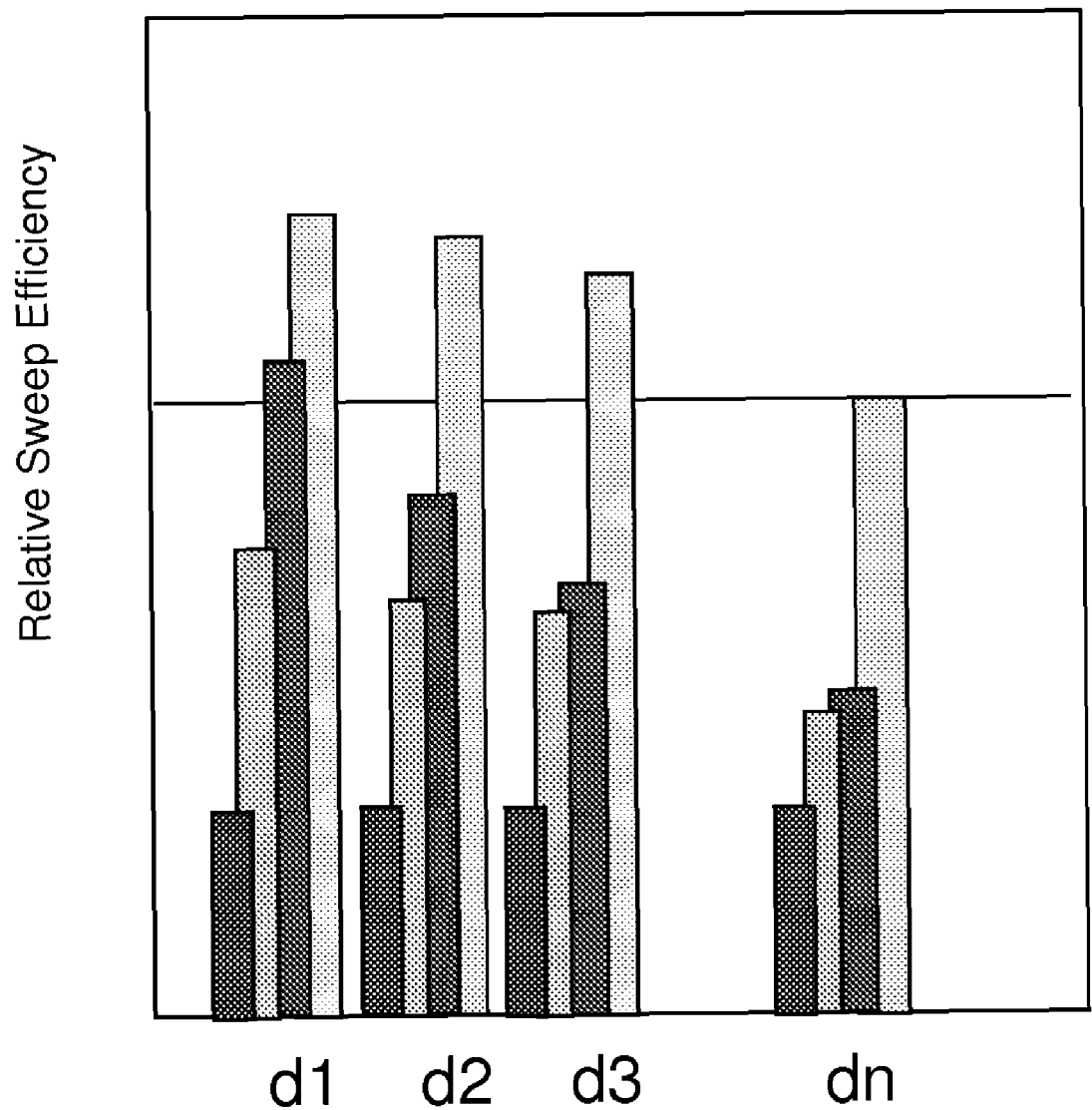
FIG. 7 illustrates the evolution of the sweep efficiency profile with time or in accordance with the amount of pumped fluid.

If the NMR tool is co-located with the pumping tool, the sweep efficiency can be determined not just before and after the pumping but at several times during the pumping. As a result the measurement can yield a time evolution (directly or in units of TSPV pumped) of the sweep efficiency profile. In FIG. 7, there is shown an example of how time lapse sweep efficiency measurements can be presented. The graph shows sweep efficiencies at four depth levels d1, d2, d3 and dn for four different volumes of pumped fluids 1×TSPV, 2×TSPV, 3×TSPV and the asymptotic value (equivalent to an infinite amount of pumped volume. All values are normalized to the value of dn at infinity and are shown as increasing in size with the amount of pumped fluid.

It is expected that a time evolution measurement of the sweep efficiency profiles further improves the determination of formation parameters as mentioned above. The time lapse profile can also be used to extrapolate the asymptotic value E∞, which can be a useful indicator of heterogeneities of the pore system or fractures or heterogeneity in form of laminations in the axis of the borehole. This information can also be used to estimate how much oil is recoverable from reservoir.

Further extension and improvements of the above example are envisaged including the use of a direct measurement of the pumped flow velocity in the formation using for example methods as proposed in the above-cited the co-owned U.S. Pat. No. 7,180,288 to Scheven.

As mentioned above the efficiency profile can be used in characterizing the rock type, particularly when sweep efficiency profiles a normalized in a standard manner using for example any of the above definitions of sweep efficiency and stored in databases linked to the rock type. Assuming the existence of such databases, a measured sweep efficiency profile can then be used to identify the rock type by similarity analysis.

By repeating the above measurements at different depths in a well, it is possible to measure a continuous or non-continuous depth log of the above parameter profiles. Such a depth log will also yield a radial and vertical profile providing parameter characteristic of the rock including the sweep efficiency in a vertical sense, the relative permeability, and homogenous or anisotropic nature of the fluid flow. Performing time lapse measurements as depth logs can be expected to further resolve sweep efficiency, re-invasion and fluid progression both radially and vertically within zones of interest.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A method of measuring a parameter characteristic of a rock formation, said method comprising the steps of deploying in a section of a well penetrating the rock formation a toolstring combining a tool for generating and measuring responses to a sensing field at different radial depth shells in the rock formation relative to the well and a tool to cause a flow of fluid through the different radial depth shells; wherein responses to the sensing field are obtained for at least two different radial depth shells and for at least two different flow conditions in said at least two different radial depth shells to determine a radial depth dependent profile of said parameter and wherein said parameter represents a radial sweep efficiency profile indicative of sweep efficiency.

2. The method of claim 1, further including the step of determining the amount of fluid caused to flow through the depth shells.

3. The method of claim 1, further including the step of determining pore volumes of the at least two different depth shells.

4. The method of claim 1, further including the step of determining total pore volumes of the at least two different depth shells.

5. The method of claim 1, further including the step of determining the amount of fluid caused to flow through a depth shell in units of pore volume of the respective depth shell.

6. The method of claim 1, wherein the sweep efficiency is an asymptotic sweep efficiency.

7. The method of claim 1, wherein the sweep efficiency is a differential sweep efficiency.

8. The method of claim 1, wherein the sweep efficiency is normalized using the sweep efficiency at one of the depth shells as a normalizing factor.

9. The method of claim 1, including the step of determining the evolution of the radial sweep efficiency profile indicative of sweep efficiency at various radial depths from the well while varying the amount of fluid caused to flow through the depth shells.

10. The method of claim 1, including the step of determining the sweep efficiency profile by determining saturations in and a volume of fluid caused to flow through the at least two different radial depths.

11. The method of claim 1, including the step of determining the sweep efficiency profile by determining saturations in and the flow rate of fluid caused to flow through the at least two different radial depths.

12. The method of claim 1, wherein the tools are located at approximately the same depth in the well when causing the flow and measuring the response.

13. The method of claim 1, wherein the tools are co-located to measure the responses while causing the flow.

14. The method of claim 1, including the further step of determining a wettability of the rock formation.

15. The method of claim 1, including further the step of determining a wettability of the rock formation using the sweep efficiency profile indicative of sweep efficiency at various radial depths from the well.

16. The method of claim 1, including further the step of determining the efficiency of a subterranean reservoir treatment aimed at increasing the production of hydrocarbons.

17. The method of claim 1, including the further step of comparing a radial depth profile of the sweep efficiency with stored radial depth profiles.

18. The method of claim 1, including the further step of comparing a radial depth profile of the sweep efficiency with stored radial depth profiles indicative of different rock types.

19. The method of claim 1, wherein said tool for generating and measuring responses to a sensing field at different radial depth shells is based on nuclear magnetic resonance (NMR).

20. The method of claim 1, performed at different depths along the well to generate a depth log of the radial depth dependent profile of the sweep efficiency.

21. A method of measuring a parameter characteristic of a rock formation, said method comprising the steps of deploying in a section of a well penetrating the rock formation a toolstring combining a tool for generating and measuring responses to a sensing field at different radial depth shells in the rock formation relative to the well and a tool to cause a flow of fluid through the different radial depth shells; wherein responses to the sensing field are obtained for at least two different radial depth shells and for at least two different flow conditions in said at least two different radial depth shells to determine a radial depth dependent profile of said parameter and using said profile to determine the efficiency of a subterranean reservoir treatment aimed at increasing the production of hydrocarbons.

* * * * *